(12) United States Patent
Kondou et al.

(10) Patent No.: US 11,922,614 B2
(45) Date of Patent: Mar. 5, 2024

(54) WELDING CONDITION SETTING ASSISTANCE DEVICE

(71) Applicant: Panasonic Intellectual Property Management Co., Ltd., Osaka (JP)

(72) Inventors: Akinobu Kondou, Kyoto (JP); Yasuhiro Kinugasa, Osaka (JP); Kaede Kunimaru, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 333 days.

(21) Appl. No.: 17/532,841

(22) Filed: Nov. 22, 2021

(65) Prior Publication Data

US 2022/0084192 A1 Mar. 17, 2022

Related U.S. Application Data

(63) Continuation of application No. PCT/JP2020/021553, filed on Jun. 1, 2020.

(30) Foreign Application Priority Data

Jun. 6, 2019 (JP) .................................. 2019-106355

(51) Int. Cl.
*G06T 7/00* (2017.01)
*B23K 9/095* (2006.01)
*G06T 7/70* (2017.01)

(52) U.S. Cl.
CPC .......... *G06T 7/0004* (2013.01); *B23K 9/0956* (2013.01); *G06T 7/70* (2017.01);
(Continued)

(58) Field of Classification Search
CPC .................... G06T 7/0004; G06T 7/70; G06T 2207/10016; G06T 2207/20081;
(Continued)

(56) References Cited

U.S. PATENT DOCUMENTS

| 2008/0232677 A1* | 9/2008 | Schwarz | B23K 9/1274 382/152 |
| 2016/0193681 A1* | 7/2016 | Pesme | B23K 9/1274 219/136 |

(Continued)

FOREIGN PATENT DOCUMENTS

| JP | 2008-126274 | 6/2008 |
| JP | 2009-028775 | 2/2009 |

(Continued)

OTHER PUBLICATIONS

International Search Report of PCT application No. PCT/JP2020/021553 dated Aug. 18, 2020.

(Continued)

*Primary Examiner* — Neil R McLean
(74) *Attorney, Agent, or Firm* — Wenderoth, Lind & Ponack, L.L.P.

(57) ABSTRACT

Image processing unit is provided in computer, and performs: for each of input images constituting a moving image obtained by capturing a workpiece during arc welding, a spatter detection step of detecting a spatter from an input image constituting a moving image of the workpiece, the moving image being generated by capturing the workpiece during the arc welding; a background bright spot identification step of identifying, as a background bright spot, a position in the moving image, the position being a position where a number of times of the detection in the spatter detection step is equal to or more than a predetermined reference number of times; and a spatter number identification step of identifying, for one input image, a number of spatters excluding spatters each corresponding to the background bright spot identified by the background bright spot identification step among the spatters detected by the spatter detection processing.

7 Claims, 7 Drawing Sheets

(52) U.S. Cl.
CPC ............... *G06T 2207/10016* (2013.01); *G06T 2207/20081* (2013.01); *G06T 2207/30164* (2013.01); *G06T 2207/30242* (2013.01)

(58) Field of Classification Search
CPC ........... G06T 2207/30164; G06T 2207/30242; B23K 9/0956; B23K 9/095; B23K 31/125; B23K 9/32; G06V 10/56; G06V 10/82; G06V 2201/06
USPC ........................................................ 382/152
See application file for complete search history.

(56) References Cited

U.S. PATENT DOCUMENTS

2017/0113292 A1* 4/2017 Nishimura ............. B23K 9/124
2018/0056429 A1 3/2018 Yoshino et al.

FOREIGN PATENT DOCUMENTS

| JP | 2012-174083 | 9/2012 |
| JP | 2014-14857 | 1/2014 |
| WO | 2019/239644 | 12/2019 |

OTHER PUBLICATIONS

Office Action dated Jun. 28, 2023 in corresponding Indian Patent Application No. 202147060870.

* cited by examiner

WELDING CONDITION SETTING ASSISTANCE DEVICE

TECHNICAL FIELD

The present invention relates to a device that assists setting of a welding condition when arc welding is performed by generating an arc between a workpiece and an electrode by applying a voltage between the workpiece and the electrode.

BACKGROUND ART

PTL 1 discloses a technique for identifying the number of spatters generated during arc welding using a video camera. Specifically, this technique acquires a plurality of input images by capturing an arc with a video camera during arc welding, takes in a luminance distribution on a predetermined detection line in the image for each input image, and detects spatters passing on the detection line based on the luminance distribution.

CITATION LIST

Patent Literature

PTL 1: Unexamined Japanese Patent Publication No. 2009-28775

SUMMARY OF THE INVENTION

However, in PTL 1 described above, since the spatters passing on the detection line are detected on the basis of the plurality of input images, the accuracy of the number of the identified spatters deteriorates when the capturing speed of the video camera is slow. Therefore, a video camera with a high imaging speed is required, and equipment cost increases.

The present invention has been made in view of such a point, and an object of the present invention is to reduce equipment cost.

One aspect of the present invention relates to a device that assists setting of a welding condition when arc welding is performed by generating an arc between a workpiece and an electrode by applying a voltage between the workpiece and the electrode. This device includes an image processing unit that performs: a spatter detection step of detecting a spatter from each of a plurality of input images constituting a moving image of the workpiece, the spatter being an area included in the input image, the area including a plurality of continuous pixels each having a pixel value exceeding a predetermined threshold, the pixel value indicating a brightness, the moving image being generated by capturing the workpiece during the arc welding; a background bright spot identification step of identifying, as a background bright spot, a position collocated in the plurality of input images in the moving image, the position being a position at which a number of times of the detection in the spatter detection step for the plurality of input images is equal to or more than a predetermined reference number of times; and a spatter number identification step of identifying, for one of the plurality of input images, a number of spatters excluding spatters each corresponding to the background bright spot identified by the background bright spot identification step among the spatters detected by the spatter detection processing.

According to this aspect, since the spatter detection processing for each input image can be performed using only one input image, a video camera having a high capturing speed is not required, and equipment cost can be reduced.

Furthermore, since the number of spatters larger than a predetermined size corresponding to the threshold is identified, it is easy to set a welding condition so that the number of spatters larger than the predetermined size is reduced by referring to the identified number of spatters. Therefore, it is easy to reduce the spatters larger than the predetermined size.

Moreover, even in a case where reflected light of arc light from a peripheral device is detected as spatters by the spatter detection processing, the number of spatters excluding spatters detected at a position where the reflected light is reflected is identified, so that the number of the spatters can be more accurately identified.

According to the welding condition setting assistance device of the present invention, the spatter detection processing for each input image can be performed using only one input image, so that a video camera with a high capturing speed is unnecessary, and equipment cost can be reduced.

Furthermore, since the number of spatters larger than a predetermined size corresponding to the threshold is identified, it is easy to set a welding condition so that the number of spatters larger than the predetermined size is reduced by referring to the identified number of spatters. Therefore, it is easy to reduce the spatters larger than the predetermined size.

Moreover, even in a case where reflected light of arc light from a peripheral device is detected as spatters by the spatter detection processing, the number of spatters excluding spatters detected at a position where the reflected light is reflected is identified, so that the number of the spatters can be more accurately identified.

DESCRIPTION OF EMBODIMENT

Hereinafter, an exemplary embodiment of the present invention will be described with reference to the drawings. The following description of the preferred exemplary embodiment is inherently only an example and is not at all intended to limit the present invention, applications of the present invention, or use of the present invention.

Figure 1:
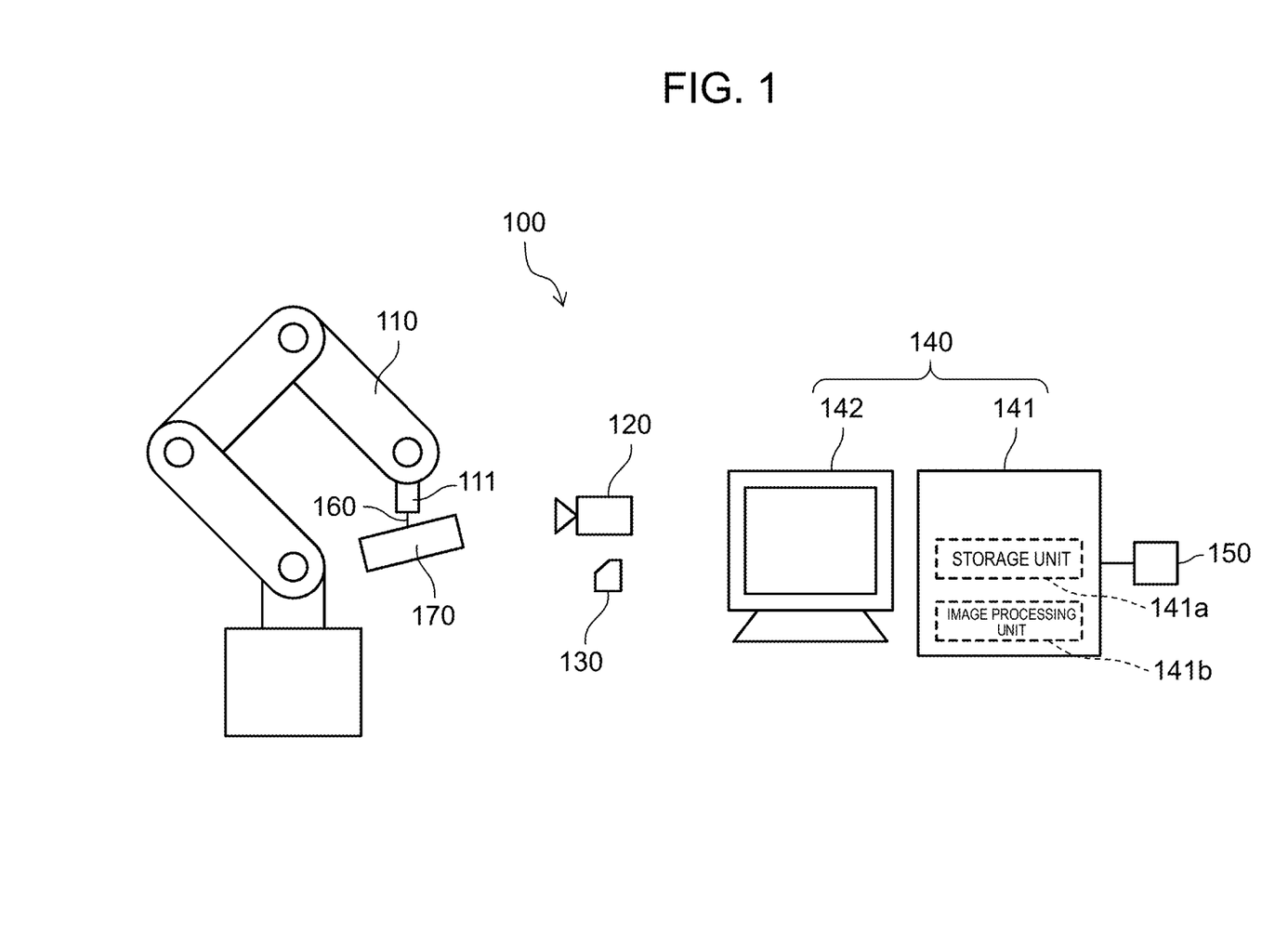
FIG. 1 is a diagram illustrating a schematic configuration of a welding system including a computer as a welding condition setting assistance device according to an exemplary embodiment of the present invention.

FIG. 1 illustrates welding system 100. Welding system 100 includes welding robot 110, video camera 120, memory card 130 housed in video camera 120, computer 140 as a welding condition setting assistance device according to an exemplary embodiment of the present invention, and card reader 150 connected to computer 140.

Figure 2:
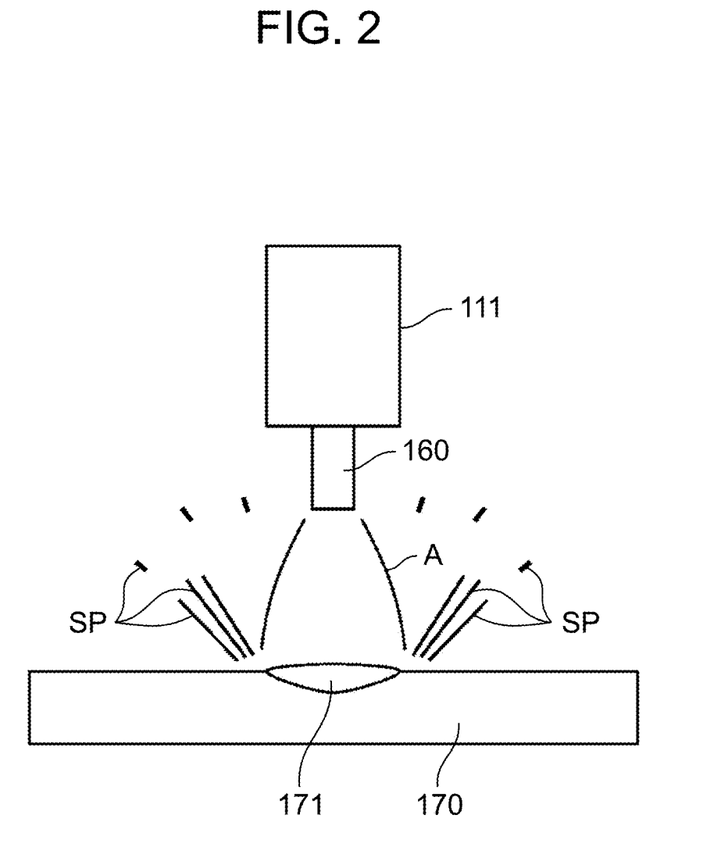
FIG. 2 is an explanatory diagram illustrating spatters generated during arc welding.

As also illustrated in FIG. 2, welding robot 110 includes welding torch 111 capable of holding welding wire 160. Workpiece 170 is held by a welding jig (clamp). Welding wire 160 serves as an electrode held by welding torch 111. Welding robot 110 applies a voltage between workpiece 170 and welding wire 160 to generate arc A between workpiece 170 and welding wire 160 to perform arc welding. During the arc welding, a portion to be welded of workpiece 170 is melted to form molten pool 171, and spatters SP are scattered from molten pool 171. Note that a jet hole (not illustrated) for jetting a shield gas is provided at a tip of welding torch 111.

Video camera 120 is installed at a position where an entire scattering area of spatters SP including entire workpiece 170 can be captured via a neutral density (ND) filter (not illustrated). Video camera 120 stores a captured moving image in memory card 130. Note that a frame rate (capturing speed) of video camera 120 is set to, for example, 60 fps. Furthermore, the focus and aperture of video camera 120, and the shutter speed of an electronic shutter are fixed.

Computer 140 includes computer main body 141 and display 142. Computer main body 141 includes storage unit 141a and image processing unit 141b.

Storage unit 141a stores a learned model generated by supervised learning using a plurality of images in which spatters SP are captured and a plurality of images in which spatters SP are not captured as teacher data. As a technique of supervised learning for generating a learned model, for example, deep learning is used. Furthermore, storage unit 141a further stores a moving image captured by video camera 120 and a plurality of still images obtained by dividing the moving image.

Image processing unit 141b reads from memory card 130 the moving image stored in memory card 130 inserted into card reader 150, and stores the moving image in storage unit 141a. Furthermore, image processing unit 141b divides the moving image stored in storage unit 141a into a plurality of still images (frames), and stores the plurality of still images in storage unit 141a as a plurality of input images. Further, image processing unit 141b performs spatter detection processing of detecting the spatters SP on each of the plurality of input images stored in storage unit 141a, identifies, as background bright spots, positions on the moving image where the number of times of detection of spatters SP is equal to or more than a predetermined reference number of times, and identifies the number of spatters SP excluding spatters SP detected at the background bright spots (spatter detection step, background bright spot identification step, spatter number identification step). Image processing unit 141b detects spatters SP using a learned model stored in storage unit 141a. Furthermore, image processing unit 141b selects one input image from the plurality of input images, and generates processed image I (see FIG. 7) obtained by applying a predetermined process to the selected input image (image generation step). Details of the method of detecting spatters SP, the method of identifying the background bright spots, the method of identifying the number of spatters SP, and the method of generating processed image I will be described later.

Display 142 displays processed image I generated by image processing unit 141b of computer main body 141.

Figure 3:
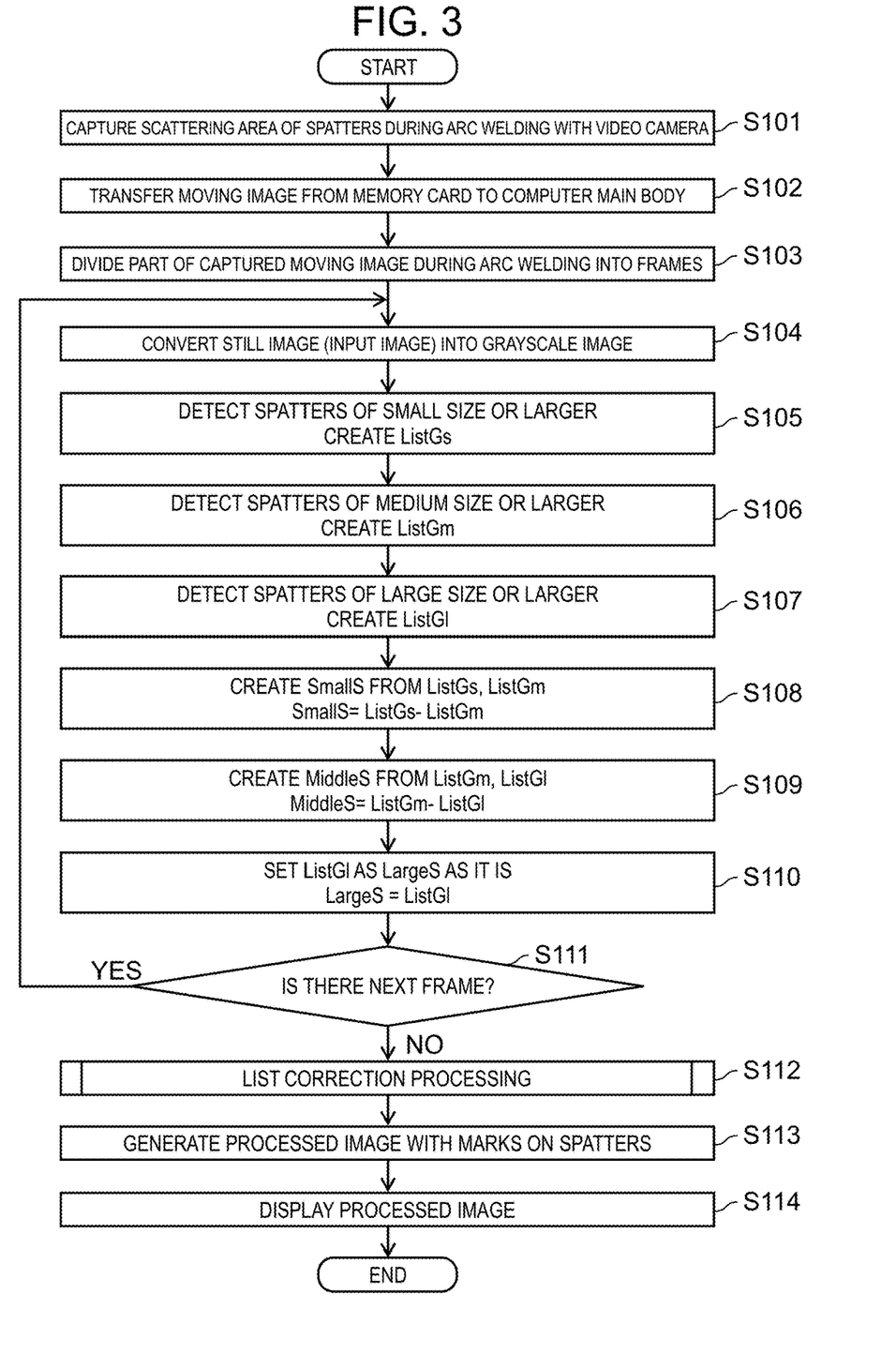
FIG. 3 is a flowchart illustrating a procedure of counting the number of spatters using a computer as a welding condition setting assistance device according to an exemplary embodiment of the present invention.

Hereinafter, a procedure for setting a welding condition of welding system 100 will be described with reference to FIG. 3.

First, in (S101), a user causes video camera 120 to capture an image while causing welding robot 110 to perform arc welding, and stores the captured moving image in memory card 130. As a result, the moving image of the entire scattering area of spatters SP including entire workpiece 170 during arc welding is stored in memory card 130.

Next, in (S102), the user takes out memory card 130 from video camera 120, inserts the memory card into card reader 150, and transfers the moving image stored in memory card 130 from card reader 150 to computer main body 141. Then, image processing unit 141b of computer main body 141 receives the moving image transferred from card reader 150, and stores the moving image in storage unit 141a.

Next, in (S103), the user causes image processing unit 141b of computer main body 141 to divide the moving image during arc welding stored in storage unit 141a into a plurality of still images (frames), and store the plurality of still images in storage unit 141a as a plurality of input images.

Next, in (S104), image processing unit 141b converts one input image that has not yet been subjected to the processing of (S104) to (S110) among the plurality of input images stored in storage unit 141a into a grayscale image. The grayscale image includes a plurality of pixels. Each pixel has a pixel value indicating brightness.

Figure 6:
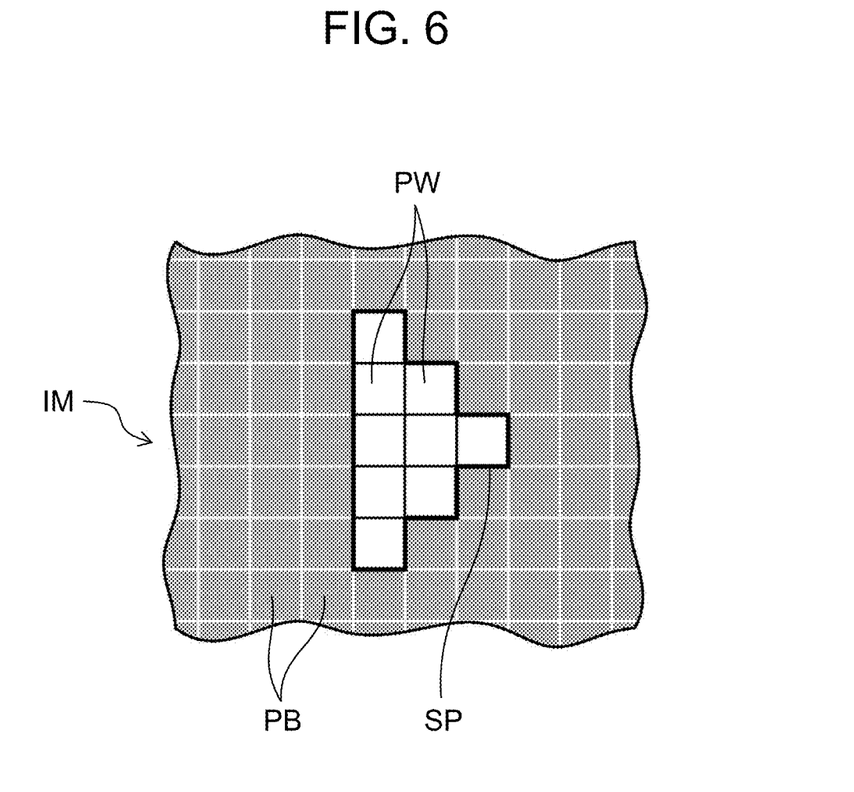
FIG. 6 is an explanatory diagram illustrating detected spatters.

Next, in (S105), image processing unit 141b generates spatter detection target image IM from the grayscale image obtained in (S104). Specifically, image processing unit 141b performs processing of converting a pixel value of a pixel having a pixel value equal to or less than predetermined threshold Gs (first threshold) in the grayscale image into a value (0) indicating black. On the other hand, image processing unit 141b maintains a pixel value of a pixel having a pixel value exceeding predetermined threshold Gs in the grayscale image as it is. As a result, the pixel having a pixel value exceeding predetermined threshold Gs is identified as a pixel other than black (hereinafter, the pixel is referred to as a gray pixel). Then, for example, as illustrated in FIG. 6, image processing unit 141b detects, as spatters SP, an area (hereinafter, referred to as a gray area) in which a plurality of gray pixels in spatter detection target image IM are continuous (spatter detection processing). In FIG. 6, PB represents a black pixel, and PW represents a gray pixel. Here, image processing unit 141b detects spatters SP using the learned model stored in storage unit 141a. Then, image processing unit 141b creates first spatter list ListGs that identifies all detected spatters SP. Note that a pixel value of a pixel having a pixel value exceeding threshold Gs may be converted into a specific value other than black (for example, white).

Next, in (S106), image processing unit 141b executes the same processing as in (S105) except for the threshold. That is, image processing unit 141b performs processing of converting a pixel value of a pixel having a pixel value equal to or less than predetermined threshold Gm (second threshold) into a value (0) indicating black on the grayscale image obtained in (S104), and detects a gray area in the processed image as spatters SP. Also here, image processing unit 141b detects spatters SP using the learned model stored in storage unit 141a. Note that threshold Gm is set to a value larger than threshold Gs. Then, image processing unit 141b creates second spatter list ListGm that identifies all detected spatters SP.

Next, in (S107), image processing unit 141*b* executes the same processing as in (S105) except for the threshold. That is, image processing unit 141*b* performs processing of converting a pixel value of a pixel having a pixel value equal to or less than predetermined threshold Gl into a value (0) indicating black on the grayscale image obtained in (S104), and detects a gray area in the processed image as spatters SP. Also here, image processing unit 141*b* detects spatters SP using the learned model stored in storage unit 141*a*. Note that threshold Gl is set to a value larger than threshold Gm. Then, image processing unit 141*b* creates third spatter list ListGl that identifies all detected spatters SP. In first to third spatter lists ListGs, ListGm, and ListGl, spatters SP are identified by upper left coordinates and lengths in a longitudinal direction and a lateral direction of spatters SP.

Here, as the size of spatter SP increases, the brightness of spatter SP also increases. Thresholds Gs, Gm, and Gl correspond to a small size, a medium size, and a large size, respectively. In (S105), small-sized, medium-sized, and large-sized spatters SP are detected. In (S106), medium-sized and large-sized spatters SP are detected. In (S107), large-sized spatters SP are detected.

Next, in (S108), image processing unit 141*b* creates small spatter list SmallS that identifies spatters SP obtained by removing spatters SP identified by second spatter list ListGm from spatters SP identified by first spatter list ListGs.

Subsequently, in (S109), image processing unit 141*b* creates middle spatter list MiddleS that identifies spatters SP by removing spatters SP identified by third spatter list ListGl from spatters SP identified by second spatter list ListGm.

Subsequently, in (S110), image processing unit 141*b* sets third spatter list ListGl as large spatter list LargeS as it is.

Next, in (S111), image processing unit 141*b* determines whether or not an input image (frame) that has not been subjected to the processing of (S104) to (S110) remains in storage unit 141*a*. Then, in a case where it remains, the process returns to (S104), and in a case where it does not remain, the process proceeds to (S112).

Then, in (S112), image processing unit 141*b* performs the following list correction processing. In the present exemplary embodiment, as described above, image processing unit 141*b* detects the gray area in the input image as spatters SP. However, the gray area may be caused by a light source (for example, arc A) different from a true spatter. The list correction processing excludes such spatters SP from the list.

Figure 4:
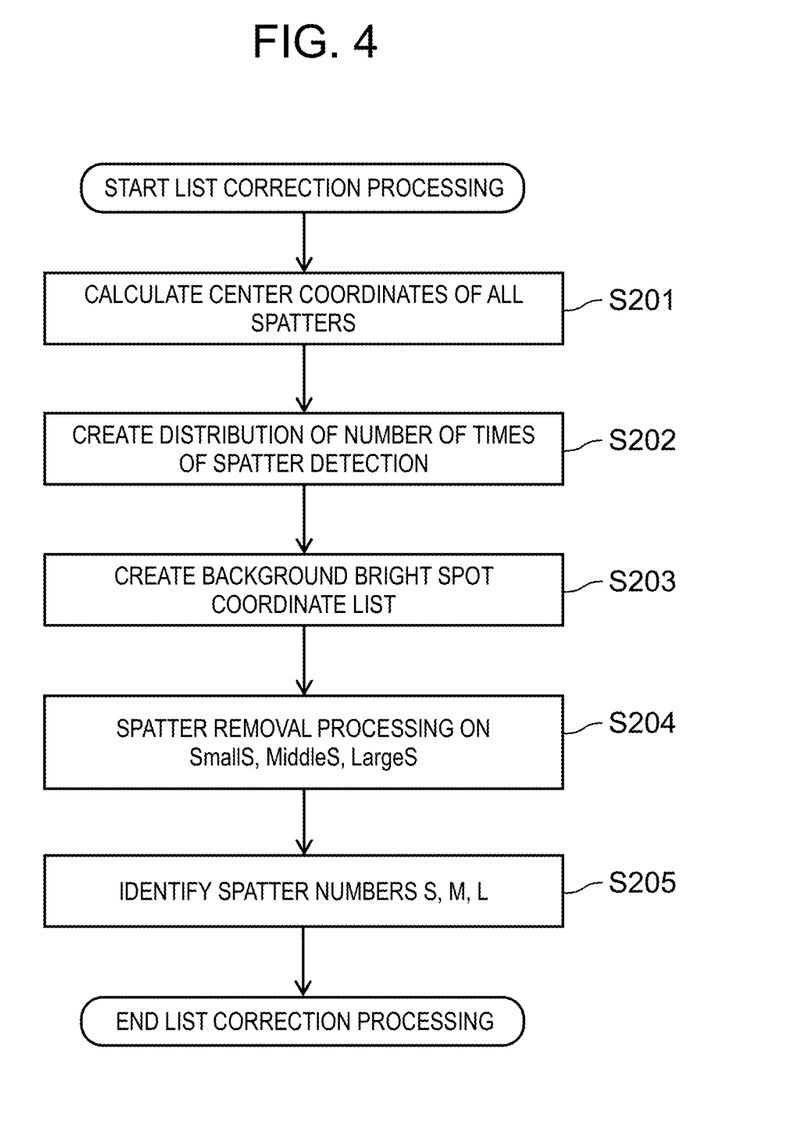
FIG. 4 is a flowchart illustrating a procedure of list correction processing.

FIG. 4 illustrates a procedure of the list correction processing performed in (S112).

In (S112), first, in (S201), image processing unit 141*b* calculates the center coordinates of all spatters SP detected in all the input images stored in storage unit 141*a*, that is, all spatters SP identified by first spatter list ListGs of all the input images. In the present exemplary embodiment, a relationship between a position in the actual scattering area and a position (coordinate) in the input image is common to all the input images. For example, the moving image includes first and second input images. A specific coordinate (for example, x=100, y=100) in the first input image points to a specific location (for example, an upper left corner of workpiece 170) in the actual scattering area. The same coordinate (x=100, y=100) in the second input image points to the same specific location (upper left corner of workpiece 170) in the actual scattering area.

Next, in (S202), image processing unit 141*b* calculates the number of times (the number of times of spatter detection) calculated as the center coordinates of spatters SP in (S201) for each position (coordinate) on the moving image. Image processing unit 141*b* stores a plurality of positions on the moving image and the number of times of spatter detection corresponding to the respective positions as a distribution of the number of times of spatter detection.

Next, in (S203), image processing unit 141*b* identifies, as background bright spots, coordinates (positions) on the moving image at which the number of times of spatter detection calculated in (S202), that is, the number of times of detection of spatters SP in the processing of (S105) is equal to or more than a predetermined reference number of times. Then, a background bright spot coordinate list for identifying coordinates of the background bright spots is created.

Next, in (S204), image processing unit 141*b* performs spatter removal processing on small spatter list SmallS, middle spatter list MiddleS, and large spatter list LargeS of all the input images stored in storage unit 141*a*, excluding spatters SP whose center coordinates are present in the background bright spot coordinate list created in (S203). That is, spatters SP removed by the spatter removal processing become spatters SP having the background bright spots identified in (S203) as center coordinates.

Figure 5:
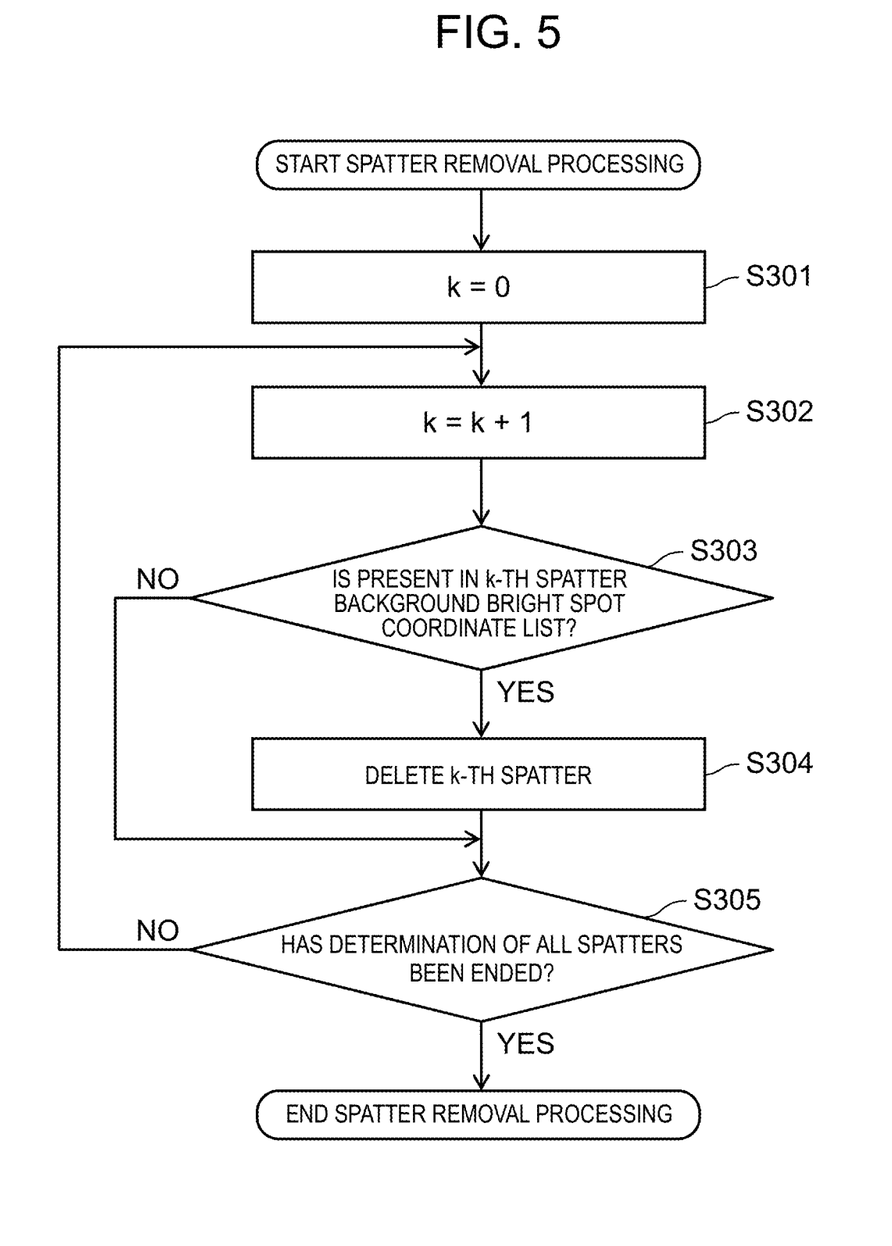
FIG. 5 is a flowchart illustrating a procedure of spatter removal processing.

Here, a specific procedure of the spatter removal processing for small spatter list SmallS will be described with reference to FIG. 5. The spatter removal processing for middle spatter list MiddleS and large spatter list LargeS is also performed by the same procedure.

First, in (S301), k=0 is set.

Next, in (S302), k=k+1 is set.

Next, in (S303), it is determined whether or not the center coordinate of k-th spatter SP of small spatter list SmallS is present in the background bright spot coordinate list. When the center coordinate of k-th spatter SP is not present in the background bright spot coordinate list, the process proceeds to (S305), and when the center coordinate is present, the process proceeds to (S304).

In (S304), k-th spatter SP is deleted from small spatter list SmallS.

In (S305), it is determined whether or not the determination of (S303) has been performed for all spatters SP of small spatter list SmallS, and in a case where the determination has not been performed, the process returns to (S302), and in a case where the determination has been performed, the spatter removal processing is terminated.

Next, in (S205), image processing unit 141*b* identifies the number of spatters SP identified by small spatter list SmallS after the correction processing as spatter number S of small spatters SP. Furthermore, the number of spatters SP identified by middle spatter list SmallM after the correction processing is identified as spatter number M of spatters SP having a medium size. Further, the number of spatters SP identified by large spatter list LargeS after the correction processing is identified as spatter number L of large spatters SP. Light from arc A may be reflected from peripheral devices such as a welding jig (clamp), welding torch 111, and a main body of welding robot 110, and enter video camera 120. Even when such reflected light is detected as spatters SP in (S105) to (S107), image processing unit 141*b* can identify the number of spatters SP excluding these spatters SP. Therefore, it is possible to more accurately identify spatter numbers S, M, and L.

Figure 7:
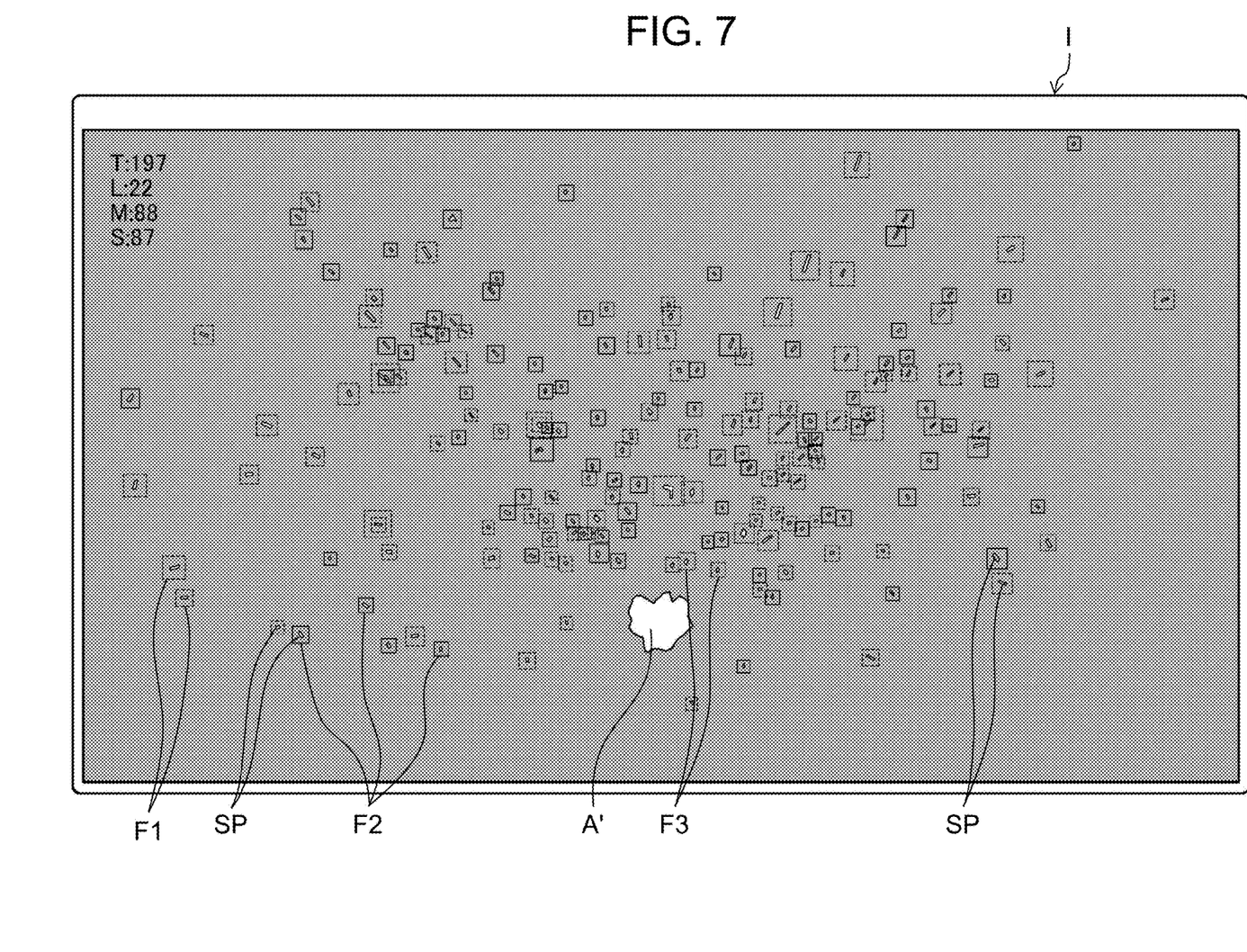
FIG. 7 is an explanatory diagram illustrating a processed image.

In (S113), image processing unit 141*b* identifies the sum of spatter numbers S, M, and L as total spatter number T. Further, image processing unit 141*b* selects one input image from the plurality of input images, and performs quantity display processing and size display processing on the selected input image to generate processed image I as illustrated in FIG. 7. Image processing unit 141b may generate a processed image corresponding to each of the plurality of input images. The quantity display processing is processing of providing display of spatter numbers S, M, and L and total spatter number T in the upper left corner of the input image. The size display processing is processing in which spatters SP identified by small spatter list SmallS after the correction processing in (S112) is surrounded by blue rectangular frame F1, spatters SP identified by middle spatter list MiddleS after the correction processing in (S112) is surrounded by yellow rectangular frame F2, and spatters SP identified by large spatter list LargeS after the correction processing in (S112) is surrounded by red rectangular frame F3. Note that, in FIG. 7, blue frame F1 is indicated by a broken line, yellow frame F2 is indicated by a solid line, and red frame F3 is indicated by a dotted line. In FIG. 7, A' indicates light of arc A and light of arc A reflected from a fume.

In (S114), display 142 displays processed image I generated in (S113). The user refers to spatter numbers S, M, and L and total spatter number T displayed on display 142 to determine the suitability of a welding condition such as a voltage value applied between workpiece 170 and welding wire 160. When the user determines that the welding condition is inappropriate, the user changes the welding condition so as to reduce the number of large spatters SP, and executes the processing of (S101) to (S114) again. Furthermore, at this time, since spatters SP are displayed on the display 142 with frames F1, F2, and F3 of colors corresponding to the sizes thereof, the user can determine the reliability of spatter numbers S, M, L, and T displayed on display 142 by referring to these frames F1, F2, and F3.

Therefore, according to the present exemplary embodiment, in (S105) to (S107), since image processing unit 141b detects spatters SP using only one input image, the processing can be simplified as compared with the case of identifying the number of spatters SP using a plurality of input images as in PTL 1. In addition, since a video camera with a high capturing speed is not required, equipment cost can be reduced.

In general, even when small spatter SP adheres to workpiece 170, spatter SP can be easily removed with a metal brush or the like. On the other hand, when large spatter SP adheres to workpiece 170, spatter SP cannot be removed without polishing with a grinder or the like, and the number of steps required for removal increases. According to the present exemplary embodiment, in (S114), the numbers of spatters SP of a plurality of types of sizes, that is, spatter numbers S, M, and L are displayed on display 142. The user can refer to these spatter numbers S, M, and L, accept the occurrence of small spatters SP, and set the welding condition so as to suppress the occurrence of large spatters SP. Therefore, the number of steps required to remove spatters SP can be reduced.

Furthermore, in (S105) to (S107), since image processing unit 141b detects spatters SP using the learned model, it is difficult to detect, as spatters SP, what are not spatters SP, such as a shielding gas or a part of a device, as compared with the case where the entire gray area is detected as spatters SP. Therefore, the possibility of erroneous detection can be reduced.

Furthermore, in a case where reflected light from a peripheral device is detected as spatters SP from a plurality of input images, the luminance of the reflected light from the peripheral device in each input image (the size of an area to be reflected) may vary depending on the situation around the reflected light. Even in such a case, in the present exemplary embodiment, in (S201) to (S203), since the coordinates at which the number of times of the center coordinates of detected spatters SP is equal to or more than the reference number of times are identified as the background bright spots, the reflected light from the peripheral device of the light of arc A can be more reliably identified as the background bright spot as compared with the case where the coordinates at which the number of times of edge coordinates of detected spatters SP is equal to or more than the reference number of times are identified as the background bright spots.

Moreover, in general, the larger spatter SP, the heavier spatter SP, and the lower the moving speed, so that the trajectory of spatter SP appearing in one input image becomes shorter as spatter SP is larger. Therefore, even when a capturing range is narrowed, large spatter SP is more likely to fall within the capturing range than small spatter SP, and detection omission of large spatter SP is less likely to occur.

Note that, in the present exemplary embodiment, image processing unit 141b once converts the input image into the grayscale image in (S104), but the input image may not be converted into the grayscale image, and a pixel whose pixel value indicating brightness exceeds the predetermined threshold may be directly identified from the input image.

Furthermore, in the present exemplary embodiment, spatters SP are detected using the learned model in (S105) to (S107), but the entire gray area may be detected as spatters SP. In addition, all the areas in which the gray pixels are continuous by the first number or more and the second number (>the first number) or less may be detected as spatters SP. In this case, since an area where the number of gray pixels exceeds the second number and the gray pixels are continuous is not detected as spatters SP, it is possible to prevent erroneous detection of what are not spatters SP as spatters SP.

Further, in the present exemplary embodiment, in (S201) to (S203), the coordinates on the input image in which the number of times corresponding to the center coordinates of detected spatters SP is equal to or more than the predetermined reference number are identified as the background bright spots. However, the coordinates on the input image in which the number of times corresponding to a predetermined position other than the centers of detected spatters SP is equal to or more than a predetermined reference number of times may be identified as the background bright spots. For example, the coordinates on the input image in which the number of times corresponding to the upper left coordinates of detected spatters SP is equal to or more than a predetermined reference number of times may be identified as the background bright spots, and the correction processing of removing spatters SP in which the upper left coordinates are the background bright spots may be performed on each of lists SmallS, MiddleS, and LargeS.

In addition, in the present exemplary embodiment, in (S201) to (S203), the background bright spot coordinate list is created based on first spatter list ListGs of all the input images, and the background bright spot coordinate list is also used for the correction processing of small spatter list SmallS, middle spatter list MiddleS, and large spatter list LargeS in (S204). However, the background bright spot coordinate list created based on small spatter list SmallS of all the input images may be used for the correction processing of small spatter list SmallS, the background bright spot coordinate list created based on middle spatter list MiddleS of all the input images may be used for the correction processing of middle spatter list MiddleS, and the background bright spot coordinate list created based on large spatter list LargeS of all the input images may be used for the correction processing of large spatter list LargeS.

Furthermore, in the present exemplary embodiment, processed image I is obtained by applying the processing of attaching frames F1, F2, and F3 to detected spatters SP on the input image, but processed image I may be obtained by applying a mark other than frames F1, F2, and F3.

Further, in the present exemplary embodiment, image processing unit 141b of computer main body 141 receives the moving image including the input image from card reader 150, but may receive the moving image from another information transmission device.

Moreover, in the present exemplary embodiment, the present invention is applied to the arc welding using welding robot 110, but the present invention can also be applied to a case where the welding torch is manually operated.

In addition, in the present exemplary embodiment, the present invention is applied when the voltage applied between workpiece 170 and welding wire 160 is not a pulse voltage. However, the present invention can also be applied to a case where the voltage applied between workpiece 170 and welding wire 160 is a pulse voltage.

INDUSTRIAL APPLICABILITY

The welding condition setting assistance device of the present invention can reduce equipment cost, can easily reduce spatters larger than a predetermined size, can more accurately identify the number of spatters, and is useful as a device that assists setting of a welding condition when arc welding is performed by generating an arc between a workpiece and an electrode by applying a voltage between the workpiece and the electrode.

REFERENCE MARKS IN THE DRAWINGS

140: computer (welding condition setting assistance device)
141a: storage unit
141b: image processing unit
142: display
160: welding wire (electrode)
170: workpiece
A: arc
SP: spatter
I: processed image
F1, F2, F3: frame (mark)

The invention claimed is:

1. A welding condition setting assistance device that assists setting of a welding condition of arc welding when the arc welding is performed by generating an arc between a workpiece and an electrode by applying a voltage between the workpiece and the electrode, the device comprising:
an image processing unit that performs:
a spatter detection step of detecting a spatter from each of a plurality of input images constituting a moving image of the workpiece, the spatter being an area included in the input image, the area including a plurality of continuous pixels each having a pixel value exceeding a predetermined threshold, the pixel value indicating a brightness, the moving image being generated by capturing the workpiece during the arc welding;
a background bright spot identification step of identifying, as a background bright spot, a position collocated in the plurality of input images in the moving image, the position being a position at which a number of times of the detection in the spatter detection step for the plurality of input images is equal to or more than a predetermined reference number of times; and
a spatter number identification step of identifying, for one of the plurality of input images, a number of spatters excluding spatters each corresponding to the background bright spot identified by the background bright spot identification step among the spatters detected by the spatter detection processing.

2. The welding condition setting assistance device according to claim 1, wherein
the background bright spot identification step calculates center coordinates of the spatters detected in the spatter detection step, and identifies, as background bright spots, coordinates on the plurality of input images in the moving image in which a number of times calculated as the center coordinates is equal to or more than the predetermined reference number of times, and
the spatter number identification step identifies, for the one of the plurality of input images, a number of spatters excluding spatters whose center coordinates are the background bright spots identified by the background bright spot identification step among the spatters detected by the spatter detection processing.

3. The welding condition setting assistance device according to claim 1, wherein
the image processing unit sets the predetermined threshold to a first threshold and a second threshold larger than the first threshold, and executes the spatter detection step,
the background bright spot identification step identifies, as background bright spots, positions on the plurality of input images in the moving image where a number of times of detection of spatters in the spatter detection step in which the predetermined threshold is set to the first threshold is equal to or more than the predetermined reference number of times, and
the spatter number identification step identifies, for the one of the plurality of input images, a number of spatters excluding spatters detected by the spatter detection processing in which the predetermined threshold is set to the second threshold and spatters detected at the background bright spots identified by the background bright spot identification step among the spatters detected by the spatter detection processing in which the predetermined threshold is set to the first threshold.

4. The welding condition setting assistance device according to claim 1, wherein
the spatter detection processing detects spatters by using a learned model generated by supervised learning using a plurality of images in which spatters are captured and a plurality of images in which spatters are not captured as teacher data.

5. The welding condition setting assistance device according to claim 1, further comprising a display that displays a number of spatters identified by the spatter number identification step of the image processing unit.

6. The welding condition setting assistance device according to claim 5, wherein
the image processing unit further executes an image generation step of generating a processed image obtained by performing a process of marking the spatters detected by the spatter detection processing based on the one of the plurality of input images, and the display displays a processed image generated by the image generation step.

7. The welding condition setting assistance device according to claim 1, wherein
the spatter detection processing includes:
selecting one input image from the plurality of input images;
comparing the pixel values of pixels with the predetermined threshold for each pixel included in a selected input image;
generating a spatter detection target image from the selected input image by changing a pixel value of a pixel whose pixel value is equal to or less than the predetermined threshold in the selected input image to a first fixed value, and maintaining a pixel value of a pixel whose pixel value exceeds the predetermined threshold in the selected input image as it is or changing the pixel value to a second fixed value different from the first fixed value; and
detecting, as the spatters, an area in which a plurality of pixels whose pixel values exceed the predetermined threshold in the spatter detection target image is continuous.

\* \* \* \* \*